(12) United States Patent
Jackson et al.

(10) Patent No.: US 9,310,601 B1
(45) Date of Patent: Apr. 12, 2016

(54) SYSTEM AND METHOD FOR CONVERTING BETWEEN KEPLERIAN AND GALILEAN TELESCOPE MAGNIFICATION

(71) Applicant: LOCKHEED MARTIN CORPORATION, Bethesda, MD (US)

(72) Inventors: Paul E. Jackson, Longwood, FL (US); Gary C. Vanstone, Merritt Island, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 14/458,702

(22) Filed: Aug. 13, 2014

(51) Int. Cl.
*G02B 23/00* (2006.01)
*G02B 3/14* (2006.01)

(52) U.S. Cl.
CPC ............... *G02B 23/145* (2013.01); *G02B 3/14* (2013.01)

(58) Field of Classification Search
CPC .................................. G02B 23/14; G02B 3/14
USPC .................. 359/422–428, 432–435, 665–667
See application file for complete search history.

(56) References Cited

U.S. PATENT DOCUMENTS

| | | | |
|---|---|---|---|
| 4,190,330 A | 2/1980 | Berreman | |
| 4,572,616 A | 2/1986 | Kowel et al. | |
| 5,052,791 A * | 10/1991 | Kikuchi | 359/421 |
| 5,684,636 A * | 11/1997 | Chow et al. | 359/665 |
| 7,411,739 B2 * | 8/2008 | Obrebski et al. | 359/666 |
| 7,724,347 B2 | 5/2010 | Tseng et al. | |
| 8,120,757 B2 | 2/2012 | Dede et al. | |
| 8,264,623 B2 | 9/2012 | Marrucci | |
| 8,471,999 B2 | 6/2013 | Valyukh et al. | |
| 2006/0256429 A1 * | 11/2006 | Obrebski et al. | 359/380 |
| 2011/0262844 A1 | 10/2011 | Tabirian et al. | |
| 2013/0166113 A1 | 6/2013 | Dakin et al. | |

OTHER PUBLICATIONS

Fowler, C.W. et al., "Liquid Crystal Lens Review," Ophthal, Physiol. Opt., Apr. 1990, pp. 186-194, vol. 10, Butterworths for British College of Optometrists, Birmingham, UK.

Lin, Yi-Hsin et al., "An Electrically Tunable Optical Zoom System Using Two Composite Liquid Crystal Lenses with a Large Zoom Ratio," Optics Express, Feb. 28, 2011, pp. 47144721, vol. 19, No. 5.

* cited by examiner

*Primary Examiner* — Frank Font
(74) *Attorney, Agent, or Firm* — Terry M. Sanks, Esq.; Beusse Wolter Sanks & Maire, PLLC

(57) ABSTRACT

A system including a first refractive lens doublet comprising a first fixed focal length lens and a first liquid-based lens, the first liquid-based lens responsive to transition between a convex configuration and a concave configuration when electronically actuated, and a second refractive lens doublet comprising a second fixed focal length lens and a second liquid-based lens, the second liquid-based lens responsive to transition from a convex configuration to a concave configuration when electronically actuated. A focal length of the first liquid-based lens and a focal length of the second liquid-based lens are switched between a positive focal length and a negative focal length when electronically actuated to provide a net focal length to produce a varied collimated magnification of light.

14 Claims, 2 Drawing Sheets

SYSTEM AND METHOD FOR CONVERTING BETWEEN KEPLERIAN AND GALILEAN TELESCOPE MAGNIFICATION

BACKGROUND

Embodiments relate to magnification and, more particularly, to a system and method for varying magnification with non-movable optic components where a collimated beam is provided regardless of the magnification level.

Currently, when a system, such as, but not limited to, a telescope requires a change in magnification, lenses must be physically moved, such as, but not limited to, by a mechanical means. Such mechanical systems used to move the lenses result in bulky optical systems or mechanical systems to provide a desired magnification.

Though liquid crystal lenses have been recognized as a lens which may be used to eliminate physically moving or adjusting a location of the lens, making adjustments where continued collimation during changing magnification is still not possible. This is further realized when converting between Keplerian telescopic magnification and Galilean telescopic magnification. As such, manufactures and users of such systems would benefit from a system and method which provides for such changes in magnification while light passing through such a system remains collimated while being magnified.

SUMMARY

Embodiments relate to a system and a method for varying magnification where a collimated beam is constant with non-movable optic components. The system comprises a first refractive lens doublet comprising a first fixed focal length lens and a first liquid-based lens, the first liquid-based lens responsive to transition between a convex configuration and a concave configuration when electronically actuated and a second refractive lens doublet comprising a second fixed focal length lens and a second liquid-based lens, the second liquid-based lens responsive to transition from a convex configuration to a concave configuration when electronically actuated. A focal length of the first liquid-based lens and a focal length of the second liquid-based lens are switched between a positive focal length and a negative focal length when electronically actuated to provide a net focal length to produce a varied collimated magnification of light.

The method comprises passing a light through a first fixed focal length lens and a first liquid-based lens in a same field of view as a second fixed focal length lens and a second liquid-based lens and electronically actuating the first liquid-based lens and the second liquid-based lens to change a focal length for each liquid-based lens between a positive focal length and a negative focal length with each lens remaining stationary by changing an electrical charge applied to produce a collimated magnification of the light that varies based on whether the positive focal length or the negative focal length is applied.

Another system comprises a first lens subsystem comprising a first fixed focal length lens and at least one first liquid-based lens, a second lens subsystem comprising a second fixed focal length lens and at least one second liquid-based lens, the first lens system and the second lens subsystem are configured for light to pass through both lens subsystems, and a controller configured to actuate the first liquid-based lens and the second liquid-based lens to change a net focal length of both liquid-based lenses between a positive focal length and a negative focal length. A varied collimated magnification of light is produced dependent upon an electronic signal produced by the controller to change the net focal length.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
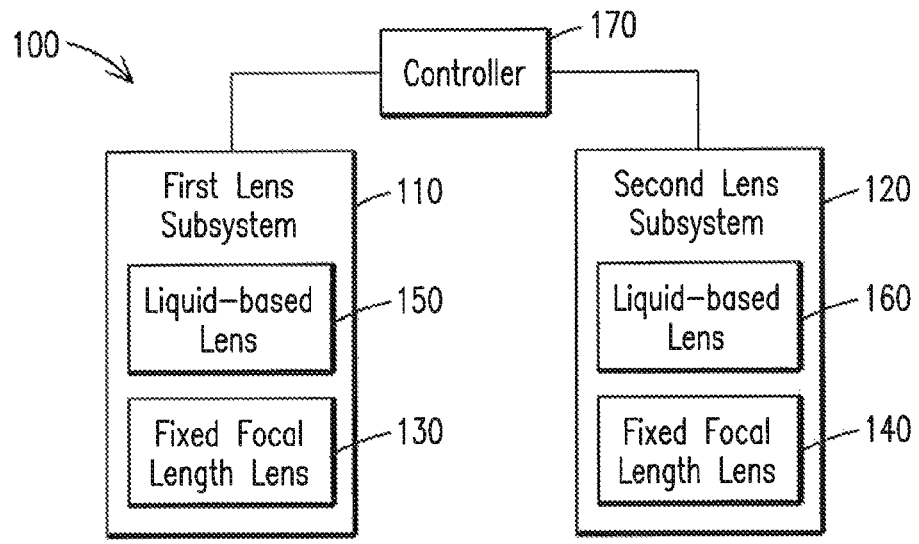
FIG. 1 illustrates a block diagram of a system.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The inventors have recognized certain limitations in telescopes involving movable optical components (e.g., a zoom lens with movable lenses and mirrors) for adjusting the magnification of the telescope. In view of such recognition, the inventors propose an innovative solution for selectively adjusting (without use of movable optical components) the magnification of a telescope, or imaging system, which in one non-limiting application may be part of a transmitter, receiver or trans-receiver of a Laser Radar (LADAR) system. As a non-limiting example, the magnification of the telescope may be selectively adjusted to match the transmitted light divergence to a receiver field of view as a range to a target of interest is changed.

FIG. 1 illustrates a block diagram of the system. In a non-limiting embodiment, a liquid crystal lens with variable focal length, such as, but not limited to, a non-refractive Pancharatnam-style lens, liquid crystal phase retarder, etc., may be arranged so that the focal length of such a lens may be switched in polarity from a positive or converging focal length to a negative or diverging focal length (and vice versa) in response to the application of a low-voltage control signal.

As illustrated in the system 100, a first lens subsystem 110 and a second lens subsystem 120 are provided. The first lens subsystem 110 and the second lens subsystem 120 are configured to operate together, such as, but not limited to, both subsystems are configured for light to pass through both lens subsystems. Each lens subsystem 110, 120 may comprise a first fixed focal length lens 130, 140 and at least one first liquid-based lens 150, 160. In other embodiments only one of the lens subsystems may comprise the fixed focal length lens and the liquid-based lens. In other embodiments, one of the lens subsystems may only comprise the liquid-based lens.

As discussed above, the liquid-based lens 150, 160 may be a liquid crystal lens. In another embodiment, the liquid-based lens 150, 160 may be a liquid lenses. A selection of a type of lens used may be based on operational conditions that may be experienced. As a non-limiting example, the liquid lens may be perturbed by gravitational forces; therefore an environment where gravitational forces are experiences may not be a suitable environment to use the liquid lens. However, since then liquid crystal lens is not as susceptible to being affected by gravitational forces, this type of lens may work better in such operational conditions.

A controller 170 may also be provided. The controller 170 may be configured to actuate the first liquid-based lens 150 and the second liquid-based lens 160 to change a net focal length of both liquid-based lenses between a positive focal length and a negative focal length. More specifically, the controller may change a focal length of any liquid-based lenses 150, 160 in the system 100. The controller 170 may be configured to provide a charge to change the focal length between a positive focal length and a negative focal length. In another embodiment, the controller controls a charge producing device (now shown) to provide an appropriate charge. The change in focal length provides for magnification to "step" zoom between at least two magnifications, a first magnification determinative by the positive focal length of the liquid-based lens 150, 160 and the second magnification determinative by the negative focal length of the liquid-based lens 150, 160. The step zoom magnification takes place while maintaining confocality of the system 100 for collimation. Thus, the magnification is not continuously tuned, but is instead instantly changed based on a charge applied to the liquid-based lens 150, 160. More specifically, a varied collimated magnification of light is produced dependent upon the electronic signal produced by the controller 170 to change the net focal length when used in an imaging system. The light which may pass through may not be limited to any particular wavelength.

Figure 2:
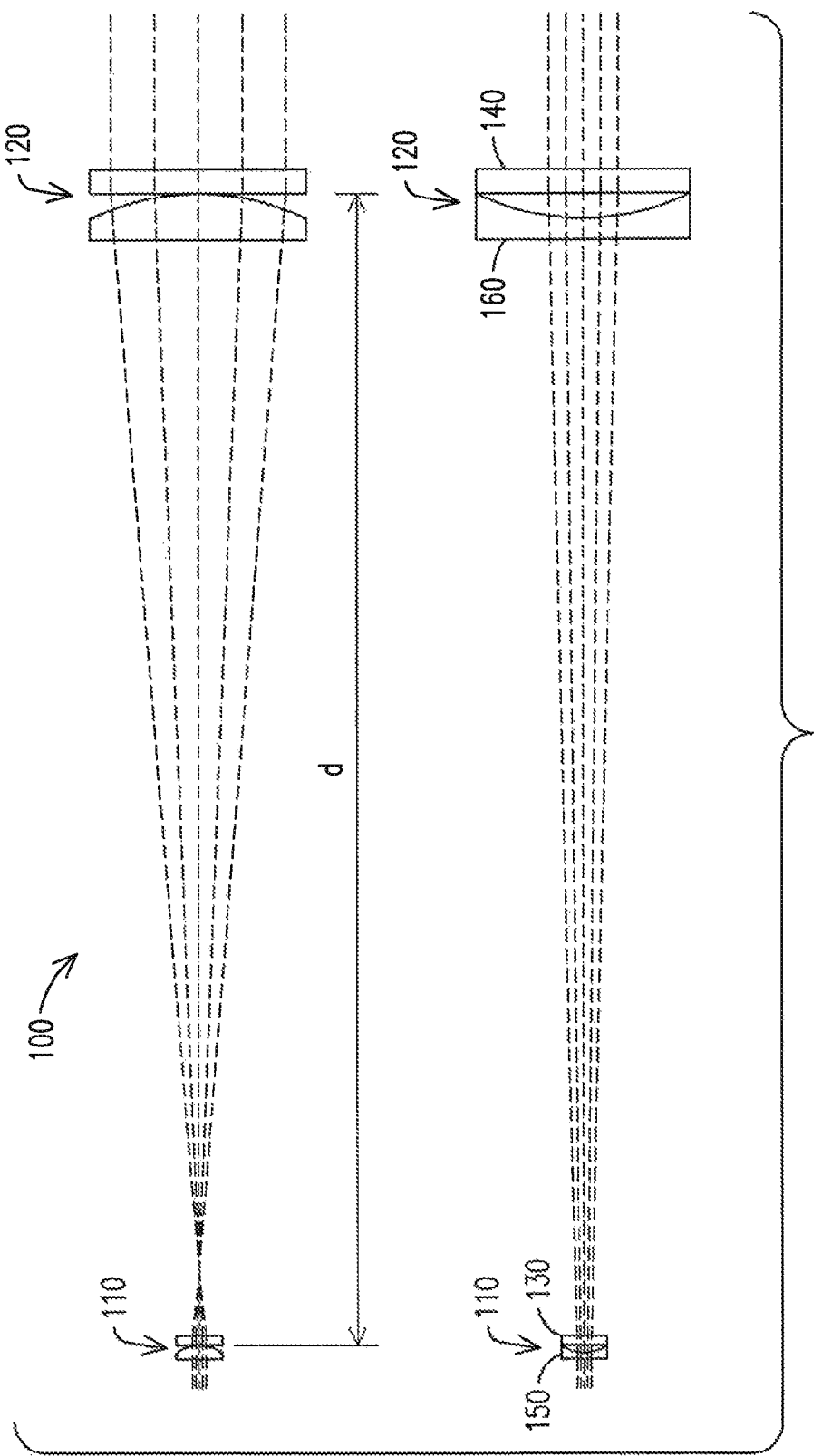
FIG. 2 illustrates an embodiment of the system utilizing liquid-based lenses for magnification.

FIG. 2 illustrates an embodiment of the system utilizing liquid-based lenses for magnification. When two or more of such lenses are arranged as a first and a second compound lenses in an imaging system, such as, but not limited to, a telescope, magnification provided by the system may be increment or decrement in what may be viewed as a quasi-continuous zoom. This may be accomplished without moving parts and can include maintaining collimation of the telescope output by maintaining the confocal spacing of the first and second lenses. The focal length of each lens may be electronically switched from positive to negative (and vice versa) and a net focal length of a series of such lenses and/or conventional refractive lenses or mirrors comprising the compounded lenses in the telescope can be adjusted, and thus in effect electronically and practically instantaneously adjusting the magnification of the telescope.

As a non-limiting example, each lens subsystem 110, 120 may be a refractive lens doublet. Thus, as illustrated, a first refractive lens doublet may comprise a first fixed focal length lens 130 and a first liquid-based lens 150. When a charge is applied, such as, but not limited to, by way of the controller 170, the first liquid-based lens 150 is responsive to transition between a convex configuration and a concave configuration when electronically actuated. A second refractive lens doublet may comprise a second fixed focal length lens 140 and a second liquid-based lens 160. When a charge is applied, such as, but not limited to, by way of the controller 170, the second liquid-based lens 160 is responsive to transition from a convex configuration to a concave configuration when electronically actuated. A focal length of the first liquid-based lens 150 and a focal length of the second liquid-based lens 160 are switched between a positive focal length and a negative focal length when electronically actuated to provide a net focal length to produce a varied collimated magnification of light.

Electronically actuating the first liquid-based lens 150 and the second liquid-based lens 160 transitions the first refractive lens doublet 110 and the second refractive lens doublet 120 between a collimated magnification of light produced by a Keplerian telescope and a collimated magnification of light produced a Galilean telescope. More specifically, the collimated magnification of the light may be produced as Keplerian telescopic magnification when the positive focal length is applied and as Galilean telescopic magnification when the negative focal length is applied. As a non-limiting example, Keplerian telescopic magnification may provide for ×14 magnification whereas using the system and method disclosed may provide for Galilean telescopic magnification at ×6, where both magnifications are collimated. As further discussed above, each lens subsystem remains stationary, meaning they do not physically move when switching magnification. Thus, confocal spacing between the first fixed focal length lens and the liquid-based lens for both lens subsystems remains constant and are not adjusted in an effort to assist or provide for magnification.

Non-limiting design equations which may be used to design each lens in FIG. 2 may be based on a distance (d) between each lens group with respect to whether Keplerian magnification (m1) or Galilean magnification (m2) is desired where magnification when using Keplerian magnification is greater than when using Galilean magnification. More specifically, m1 must be greater than m2 to utilize the following equations. With values for d, m1, and m2, these values may be applied to the equations provided below. As such, at the first lens group:

$$f1_k := \frac{d}{m1 - 1}$$

$$f1_{fix} := \frac{2 f1_k f1_g}{f1_g + f1_k};$$

$$f1_{k\_a} := \frac{-2 f1_k f1_g}{f1_k - f1_g}$$

at the second lens group:

$$f2_k := d - f1_k$$

$$f2_{fix} := \frac{2 f2_k f2_g}{f2_g + f2_k};$$

$$f2_{k\_a} := \frac{-2 f2_k f2_g}{f2_k - f2_g}.$$

When applying Galilean magnification, with a charge providing for a negative focal length of the liquid-based lenses, at the first lens group:

$$f1_g := \frac{-d}{m2-1}$$

$$f1_{fix} := \frac{2f1_k f1_g}{f1_g + f1_k};$$

$$f1_{g\_a} := \frac{2f1_k f1_g}{f1_k - f1_g}.$$

When applying Galilean magnification, with a charge providing for a negative focal length of the liquid-based lenses, at the second lens group:

$$f2_g := -f1_g + d$$

$$f2_{fix} := \frac{2f2_k f2_g}{f2_g + f2_k};$$

$$f2_{k\_a} := \frac{2f2_k f2_g}{f2_k - f2_g}$$

Thus, $f1_k$ and $f1_g$ provides for calculated net focal lengths of the primary lens doublets for the Keplerian and Galilean telescopes, respectively. These values along with the value for d are then used in the equations for $f2_2$ and $f2_g$ to calculate the corresponding net focal lengths of the second lens doublets for the Keplerian and Galilean telescopes, respectively. Once the net focal lengths, $f1_k$ and $f1_g$ (first lens group or doublet) and $f2_k$ and $f2_g$ (second lens group or doublet) for the Keplerian and Galilean telescopes are calculated, these values are used to calculate the focal lengths of the individual lenses making up the doublets. These include the fixed lens focal lengths $f1_{fix}$ and $f2_{fix}$ and the liquid lens focal lengths $f1_{g\_a} = -f1_{k\_a}$ and $f2_{g\_a} = -f2_{k\_a}$.

Hence, as illustrated above, when stepping from Keplerian telescopic magnification to Galilean telescopic magnification, the focal length of the liquid-based lens is flipped from a positive focal length to a negative focal length in the first lens subsystem 110 and the focal length is also flipped from a positive focal length to a negative focal length in the second lens subsystem 120. The flipping of the focal length is accomplished by a charge applied to the respective liquid-based lens.

Figure 3:
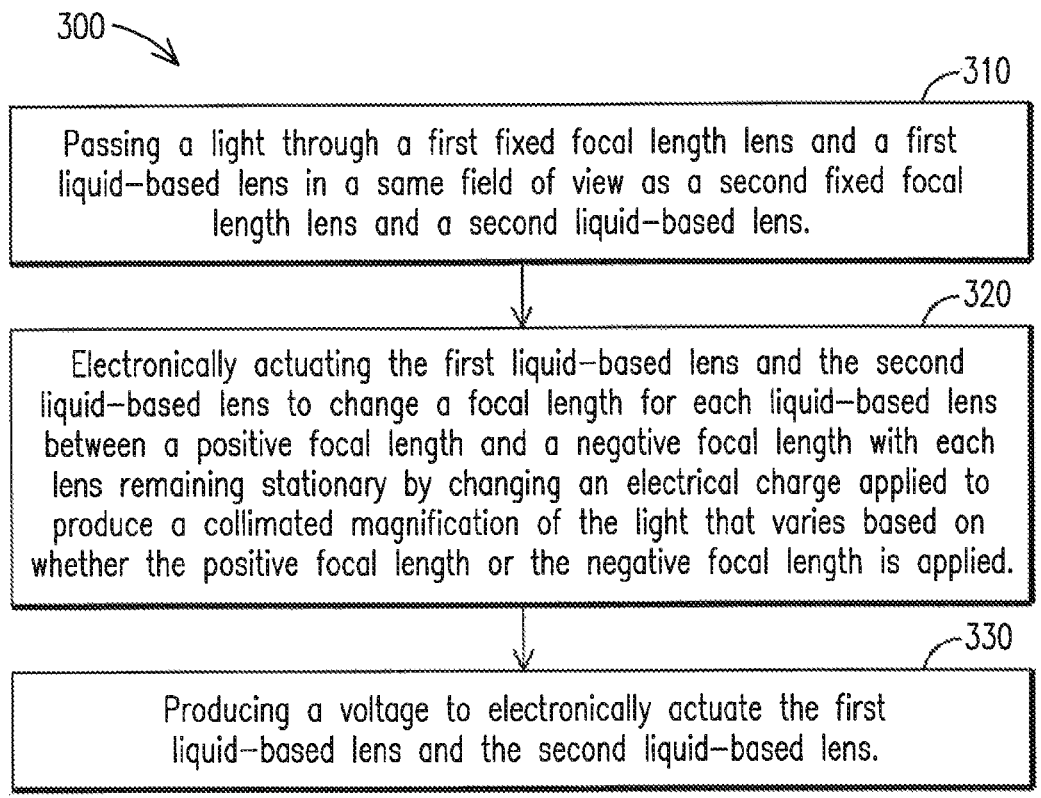
FIG. 3 illustrates a flowchart providing an embodiment of a method.

FIG. 3 illustrates a flowchart providing an embodiment of a method. The method 300 comprises passing a light through a first fixed focal length lens and a first liquid-based lens in a same field of view as a second fixed focal length lens and a second liquid-based lens, at 310. The method further comprises electronically actuating the first liquid-based lens and the second liquid-based lens to change a focal length for each liquid-based lens between a positive focal length and a negative focal length with each lens remaining stationary by changing an electrical charge applied to produce a collimated magnification of the light that varies based on whether the positive focal length or the negative focal length is applied, at 320.

The method may further comprise producing a voltage, initiated with a controller, to electronically actuate the first liquid-based lens and the second liquid-based lens, at 330. Electronically actuating may further comprise producing the collimated magnification of the light as Keplerian telescopic magnification when the positive focal length is applied and as Galilean telescopic magnification when the negative focal length is applied. The steps presented above may be varied or performed in a different order.

One example advantage of using this telescope in a transmitter in a pointing laser or a target laser designator is that the laser spot size on the target can be zoomed/adjusted and maintained as the range to target is changed. Another example advantage is in its use in a LADAR system where the field-of-view in the receiver can be adjusted to match the range.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

We claim:

1. A system comprising:
a first refractive lens doublet comprising a first fixed focal length lens and a first liquid-based lens, the first liquid-based lens transitions between a first lens convex configuration and a first lens concave configuration in response to electronic actuation; and
a second refractive lens doublet comprising a second fixed focal length lens and a second liquid-based lens, the second liquid-based lens transitions from a second lens convex configuration to a second lens concave configuration in response to the electronic actuation;
wherein a focal length of the first liquid-based lens and a focal length of the second liquid-based lens are switched between a positive focal length and a negative focal length in response to the electronic actuation to provide a net focal length to produce a varied collimated magnification of light wherein the collimated magnification of the light is produced as Keplerian telescopic magnification when the positive focal length is applied and as Galilean telescopic magnification when the negative focal length is applied.

2. The system according to claim 1, wherein in response to the electronic actuation, the first liquid-based lens and the second liquid-based lens transition the first refractive lens doublet and the second refractive lens doublet between the collimated magnification of light produced by the Keplerian telescope magnification and the collimated magnification of light produced the Galilean telescope magnification.

3. The system according to claim 1, wherein the first liquid-based lens and the second liquid-based lens individually comprises at least one liquid crystal lens.

4. The system according to claim 1, wherein the first liquid-based lens and the second liquid-based lens individually comprises at least one liquid lens.

5. The system according to claim 1, further comprising a controller configured to produce a voltage for the electronic actuation of the first liquid-based lens and the second liquid-based lens.

6. The system according to claim 1, wherein the first refractive lens doublet and the second refractive lens doublet are stationary.

7. A system comprising:
a first lens subsystem comprising a first fixed focal length lens and a first liquid-based lens;
a second lens subsystem comprising a second fixed focal length lens and second liquid-based lens, the first lens subsystem and the second lens subsystem are configured for light to pass through both the first and second lens subsystems;
a controller configured to actuate the first liquid-based lens and the second liquid-based lens to change a focal length of the first liquid-based lens and a focal length of the second liquid-based lens between a positive focal length and a negative focal length;
wherein a varied collimated magnification of light is produced dependent upon a net focal length wherein the collimated magnification of the light is produced as Keplerian telescopic magnification when the positive focal length is applied and as Galilean telescopic magnification when the negative focal length is applied.

8. The system according to claim 7, wherein the first liquid-based lens and the second liquid-based lens transition between a convex configuration and a concave configuration depending upon a voltage signal from the controller.

9. The system according to claim 7, wherein the first liquid-based lens and the second liquid-based lens individually comprises at least one liquid crystal lens.

10. The system according to claim 7, wherein the first liquid-based lens and the second liquid-based lens individually comprises at least one liquid lens.

11. The system according to claim 7, wherein the first lens subsystem and the second lens subsystem remain stationary.

12. The system according to claim 7, wherein confocal spacing between at least one of the first fixed focal length lens and the first liquid-based lens and the second fixed focal length lens and the second liquid-based lens remains constant.

13. A method comprising:
passing a light through a first fixed focal length lens and a first liquid-based lens in a field of view to a second fixed focal length lens and a second liquid-based lens;
electronically actuating the first liquid-based lens and the second liquid-based lens with an electrical charge; and
changing, in response to the electronically actuating, a focal length for each liquid-based lens between a positive focal length and a negative focal length with each lens remaining stationary to produce a collimated magnification of the light that varies based on whether the first liquid-based lens and the second liquid-based lens has the positive focal length or the negative focal length wherein the collimated magnification of the light is produced as Keplerian telescopic magnification when the focal length is the positive focal length and as Galilean telescopic magnification when the focal length is the negative focal length.

14. The method according to claim 13, wherein the electronically actuating further comprising applying voltage to the first liquid-based lens and the second liquid-based lens.

\* \* \* \* \*